(12) United States Patent
Sivakumar et al.

(10) Patent No.: US 8,036,207 B2
(45) Date of Patent: Oct. 11, 2011

(54) ADAPTIVE ROUTING

(75) Inventors: Tatikonda Venkata Lakshmi Narasinha Sivakumar, Tokyo (JP); Hongyuan Chen, Tokyo (JP); Leping Huang, Saitama (JP)

(73) Assignee: Intellectual Ventures I LLC, Wilmington, DE (US)

( * ) Notice: Subject to any disclaimer, the term of this patent is extended or adjusted under 35 U.S.C. 154(b) by 714 days.

(21) Appl. No.: 11/628,596

(22) PCT Filed: Jun. 2, 2005

(86) PCT No.: PCT/IB2005/002267
§ 371 (c)(1), (2), (4) Date: Oct. 3, 2007

(87) PCT Pub. No.: WO2005/119984
PCT Pub. Date: Dec. 15, 2005

(65) Prior Publication Data
US 2008/0112325 A1    May 15, 2008

(30) Foreign Application Priority Data
Jun. 4, 2004 (GB) .................................. 0412494.7

(51) Int. Cl.
*H04L 12/28* (2006.01)
(52) U.S. Cl. ........ 370/351; 370/238; 370/327; 370/338; 370/352; 370/400; 455/406; 455/411; 455/426.1; 455/426.2
(58) Field of Classification Search .................. 370/238, 370/327, 338, 352, 400, 401; 455/406, 411, 455/426.1, 426.2
See application file for complete search history.

(56) References Cited

U.S. PATENT DOCUMENTS

| | | | | |
|---|---|---|---|---|
| 5,339,316 A * | 8/1994 | Diepstraten | .................... | 370/401 |
| 5,412,654 A * | 5/1995 | Perkins | ......................... | 370/312 |
| 5,654,959 A * | 8/1997 | Baker et al. | .................... | 370/331 |
| 5,987,011 A * | 11/1999 | Toh | ............................... | 370/331 |
| 6,028,857 A * | 2/2000 | Poor | ............................. | 370/351 |
| 6,304,556 B1 * | 10/2001 | Haas | ............................. | 370/254 |
| 6,628,620 B1 * | 9/2003 | Cain | ............................. | 370/248 |
| 6,775,258 B1 * | 8/2004 | van Valkenburg et al. | ..... | 370/338 |
| 6,791,949 B1 * | 9/2004 | Ryu et al. | ....................... | 370/254 |
| 6,925,064 B2 * | 8/2005 | Hester et al. | ................... | 370/255 |
| 6,940,832 B2 * | 9/2005 | Saadawi et al. | ............... | 370/328 |
| 6,990,075 B2 * | 1/2006 | Krishnamurthy et al. | ..... | 370/236 |
| 7,016,306 B2 * | 3/2006 | Alapuranen et al. | .......... | 370/238 |
| 7,058,050 B2 * | 6/2006 | Johansson et al. | ............ | 370/386 |

(Continued)

OTHER PUBLICATIONS

The International Search Report for PCT/IB2005/002267 mailed on Oct. 21, 2005.

(Continued)

*Primary Examiner* — Ayaz R Sheikh
*Assistant Examiner* — Andrew C Lee

(57) ABSTRACT

Methods and devices are shown for improving an existing route between a first node and a second node in a first ad-hoc network that includes a plurality of nodes, the method and devices selecting based on a predetermined performance criterion or criteria one of a plurality of candidate routes between the first node and the second node, wherein each candidate route includes at least one inter-node link that is not included within the first ad-hoc network and at least one candidate route including multiple inter-node links; initializing, via the existing route, the use of the inter-node links of the selected candidate route; and switching from using the existing route to using the candidate route.

32 Claims, 7 Drawing Sheets

U.S. PATENT DOCUMENTS

| | | | |
|---|---|---|---|
| 7,177,295 B1* | 2/2007 | Sholander et al. | 370/338 |
| 7,280,545 B1* | 10/2007 | Nagle | 370/400 |
| 7,299,038 B2* | 11/2007 | Kennedy et al. | 455/422.1 |
| 7,310,661 B2* | 12/2007 | Treister et al. | 709/208 |
| 7,342,896 B2* | 3/2008 | Ayyagari | 370/254 |
| 7,382,765 B2* | 6/2008 | Kennedy et al. | 370/351 |
| 7,450,577 B2* | 11/2008 | Johansson et al. | 370/386 |
| 7,515,911 B2* | 4/2009 | Ebata | 455/445 |
| 7,548,526 B2* | 6/2009 | Oba et al. | 370/331 |
| 7,570,593 B1* | 8/2009 | ElBatt et al. | 370/238 |
| 7,656,848 B2* | 2/2010 | Park et al. | 370/338 |
| 7,672,307 B2* | 3/2010 | Duggi et al. | 370/392 |
| 7,701,858 B2* | 4/2010 | Werb et al. | 370/241 |
| 7,706,282 B2* | 4/2010 | Huang | 370/238 |
| 2002/0044549 A1 | 4/2002 | Johansson et al. | 370/386 |
| 2002/0150145 A1* | 10/2002 | Alriksson et al. | 375/132 |
| 2003/0037167 A1* | 2/2003 | Garcia-Luna-Aceves et al. | 709/238 |
| 2003/0081603 A1* | 5/2003 | Rune | 370/390 |
| 2003/0110291 A1* | 6/2003 | Chen | 709/244 |
| 2004/0153520 A1* | 8/2004 | Rune et al. | 709/206 |
| 2004/0196784 A1* | 10/2004 | Larsson et al. | 370/228 |
| 2004/0233855 A1* | 11/2004 | Gutierrez et al. | 370/252 |
| 2004/0233882 A1* | 11/2004 | Park et al. | 370/338 |
| 2004/0246904 A1* | 12/2004 | Zhang et al. | 370/252 |
| 2004/0264372 A1* | 12/2004 | Huang | 370/230 |
| 2004/0264466 A1* | 12/2004 | Huang | 370/392 |
| 2005/0002372 A1* | 1/2005 | Rune et al. | 370/346 |
| 2005/0188103 A1* | 8/2005 | Chen | 709/238 |
| 2006/0007863 A1* | 1/2006 | Naghian | 370/238 |
| 2006/0183423 A1* | 8/2006 | Johansson et al. | 455/41.2 |
| 2007/0263628 A1* | 11/2007 | Axelsson et al. | 370/392 |

OTHER PUBLICATIONS

The International Preliminary Examination Report and Written Opinion for PCT/IB2005/002267 issued on Dec. 4, 2006.

Sivakumar et al, "Adaptive Network Formation Protocol for Bluetooth Scatternet", *First IFIP International conference on Wireless and Optical Communication Networks*, Sultan Qaboos University, Oman, Jun. 7-9, 2004.

"A Two-Phase Scatternet Formation Protocol for Bluetooth Wireless Personal Area Networks" by Y. Kawamoto et al, WCNC 2003—IEEE Wireless Communications and Networking Conference, vol. 3, Mar. 16, 2003, pp. 1453-1458, XP010639983, New Orleans, LA, USA.

"A Routing Vector Method (RVM) for Routing in Bluetooth Scatternets" by P. Bhagwat et al, International Workshop on Mobile Multimedia Communications, Nov. 15, 1999, pp. 375-379, XP002137402.

\* cited by examiner

ADAPTIVE ROUTING

CROSS REFERENCE TO RELATED APPLICATION

This is the U.S. National Stage of International Application No. PCT/IB2005/002267 filed Jun. 2, 2005 which was published in English on Dec. 15, 2005 under International Publication Number WO 2005/119984 and which claims priority from Great Britain Application GB 0412494 filed Jun. 4, 2004.

FIELD OF THE INVENTION

Embodiments of the present invention relate to adaptive routing. In particular but not exclusively to efficient adaptive routing in low power radio frequency, ad-hoc networks having mobile nodes such as BLUETOOTH® networks.

BACKGROUND TO THE INVENTION

The basic communication network in Bluetooth networks is called a Piconet. The channel access in a Piconet is managed by a Master which is one of the participants in the communication. All other participants in the communication are called Slaves. A master is allowed to serve at most 7 slaves, and a Master can be a Slave in another Piconet. A Slave can also be a Slave in another Piconet. A Master or a Slave that participates in multiple Piconets is called a bridge node and acts as a router between the Piconets. A connected network that spans more than one Piconet is called a Scatternet. Ad hoc multi-hop networks in Bluetooth networks are formed using Scatternets.

Multi hop communications are useful for extending the communication range of a device which is constrained by the maximum device capacity of a Bluetooth Piconet and/or user preferences. For example, a smart phone may prefer to communicate through its trusted laptop or PDA to the outside world. Hence in Bluetooth based ad hoc networks, having two devices within their nominal communication range is not a guarantee that they establish a direct link. This constrains the network topology.

Network topology has a great influence on the performance of the network. A casually designed network topology might be inefficient, and also might preclude some of the applications that otherwise could operate on the network.

Most of the network formation research for Bluetooth based ad hoc networks concentrates on finding an optimal initial topology for a scatternet.

One problem with static network formation protocols is that when a node moves and the topology changes, the initial criteria satisfied by the topology may no longer be valid.

Node mobility calls for a network topology optimization strategy as an integral part of mobility management and/or data traffic routing. This application takes the second approach and addresses the problem of network topology optimization while routing the data traffic.

Adapting the topology of a network based on the requirements of a data flow is known. "A Two-Phase Scatternet Formation Protocol for Bluetooth Wireless Personal Area Network", Kawamoto, Y. et al, WCNC 2003—IEEE Wireless Communications and Networking Conference, vol. 3, 16-20 Mar. 2003, pages 1453-1458, discloses a two-phase scatternet formation protocol that supports dynamic topology changes. In a first phase, a control scatternet is constructed to support topology changes and route determination. The control scatternet does not operate according to the Bluetooth specification, but instead the piconets are synchronized so that there are common periods when a bridge node switches between piconets without informing the masters about the timing of each switch over. The second phase creates a separate on-demand scatternet whenever a source node wants to initiate data communications with another destination node. The on-demand scatternet formation is itself divided into two steps. In the first step, the control scatternet is used in the selection of a route in the control scatternet between a source and the master serving a destination. In the second step, the master node with which the source node communicates with selects the participating nodes for the on-demand scatternet. The master node uses its own slaves' and adjacent neighbor information to choose the participating nodes. Each master node must maintain all the information of its slaves and bridge nodes within its piconet and adjacent piconets. The on-demand scatternet is torn down when the data transmissions are finished. It will be appreciated that there is a heavy overhead in setting-up and maintaining the control scatternet and that the on-demand scatternet is used only as a temporary addition to the static control scatternet.

BRIEF DESCRIPTION OF THE INVENTION

According to one embodiment of the invention there is provided a method of improving an existing route between a first node and a second node in a first ad-hoc network that comprises a plurality of nodes, the method comprising: selecting based on a predetermined performance criterion or criteria one of a plurality of candidate routes between the first node and the second node, wherein each candidate route comprises at least one inter-node link that is not comprised within the first ad-hoc network and at least one candidate route comprises multiple inter-node links; initializing, via the existing route, the use of the inter-node links of the selected candidate route; and switching from using the existing route to using the candidate route.

According to another embodiment of the invention there is provided a device operable as a first node in a first ad-hoc network comprising a plurality of nodes, including the first node and a second node, and an existing route between the first node and the second node that comprises a plurality of inter-node links, the device comprising: means for selecting based on a predetermined performance criterion or criteria one of a plurality of candidate routes between the first node and the second node, wherein each candidate route comprises at least one inter-node link that is not comprised within the first ad-hoc network and at least one candidate route comprises multiple inter-node links; means for initializing, via the existing route, the use of the inter-node links of the selected candidate route; and means for switching from using the existing route to using the candidate route.

According to another embodiment of the invention there is provided a method of improving an existing route between a first node and a second node in a first ad-hoc network that comprises a plurality of nodes, the method comprising: receiving a message at a device operable as a node of an ad-hoc network; maintaining a cumulative history of the route the message has taken from the first node to the device; maintaining a performance cost of the route the message has taken from the first node to the device; then if a direct link from the device to the second node is available, establishing a candidate route for routing packets between the first and second nodes that comprises the route the message has taken from the first node to the device and the link between the device and the second node, else forwarding the message to at least another device.

According to another embodiment of the invention there is provided a device operable as a node in an ad-hoc network that comprises a plurality of nodes, the device comprising means for receiving a message from a first node; means for maintaining a cumulative history of the route the message has taken to the device; maintaining a performance cost of the route the message has taken to the device; means for determining if a direct link from the device to a second node is available; means for establishing a candidate route for routing packets between the first and second nodes that comprises the route the message has taken from the first node to the device and the link between the device and the second node if a direct link from the device to the second node is available; and means for forwarding the message to at least another device if a direct link from the device to the second node is not available.

According to another embodiment of the invention there is provided a device operable as a node in a first ad-hoc network comprising a plurality of nodes that are interconnected by a plurality of inter-node links, comprising: means for maintaining a list of neighboring devices, wherein each neighboring device is operable as a node in an ad-hoc network and operable to have a direct link to the device and wherein the list comprises a plurality of entries each of which is associated with a neighboring device and each of which comprises an identifier of the associated neighboring device and a parameter indicating the quality of a direct link between the associated neighboring device and the device.

According to another embodiment of the invention there is provided a device, operable as a node in an ad-hoc network that comprises a first link between the device and a first node, comprising: means for identifying when the first link is unused; means for determining whether there is a route via the ad-hoc network other than the first link between the device and the first node; and means for terminating the first link if there is a route.

Some embodiments of the invention provide a protocol that dynamically and permanently changes the network topology to make it efficient for data traffic while satisfying the requirements of the existing data traffic, and honoring the capability constraints of the devices.

A clear advantage of embodiments of the invention over static protocols is better network resource utilization, and mobility management.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

The proposed network formation protocol operates in two distinct phases. In the first phase an initial network is formed and in the second phase, the network is continuously changed according the traffic needs. The change in the network is a permanent change and there is no automatic reversion to an original or controlling network topology.

The proposed network formation protocol does not describe in detail initial network formation. The initial network can be formed using any of the existing protocols. It might be advantageous to form the network in a shortest possible time in order to make the network operate as quickly as possible and also because the network would be optimized as the data begins to flow in the network.

The adaptive network formation (ANF) is handled by a protocol subsystem residing in each of the nodes participating in the Scatternet. FIG. 9 illustrates a device operable as a node in an ad-hoc network and operable to carry out each of the processes illustrated in FIGS. 1 to 8.

Figure 1:
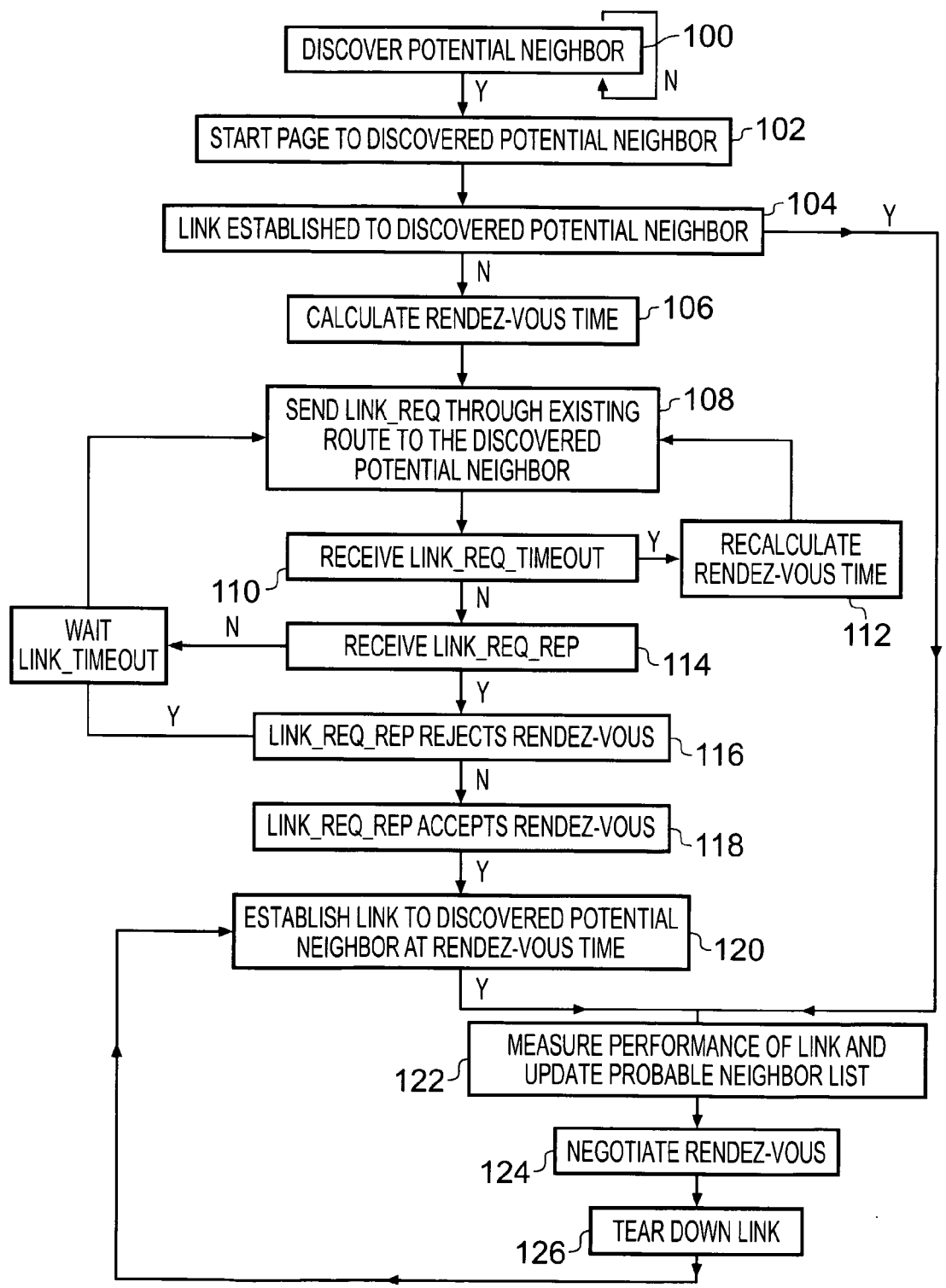
FIG. 1 illustrates a process for measuring for each discovered potential neighbor the performance of the respective link to that neighbor and the storage of the results in a probable neighbor list.

The Adaptive Network Formation process consists of a discovery process as illustrated in FIG. 1 and a network optimization process as illustrated in FIGS. 2 to 8.

The discovery process is responsible for maintaining information regarding potential neighbors, and the quality of the links a node can establish with them.

The network optimization process is responsible for forming new links and tearing down old links based on the data traffic requirements. This process utilizes the information gathered in the discovery process.

Figure 2:
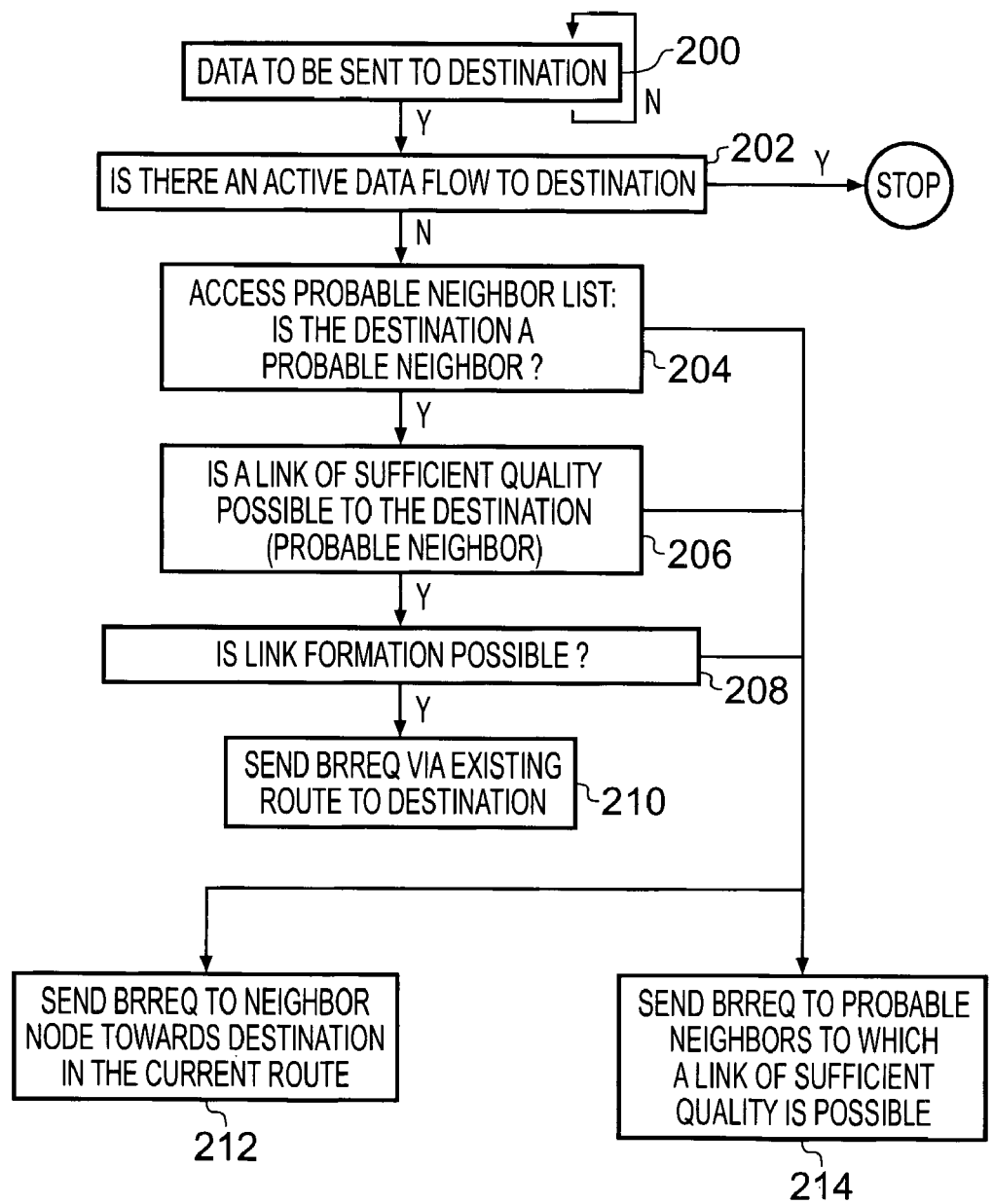
FIG. 2 illustrates a start portion of a process. The process determines candidate routes between the source node and a destination node. The start portion occurs at the source node.
Figure 3:
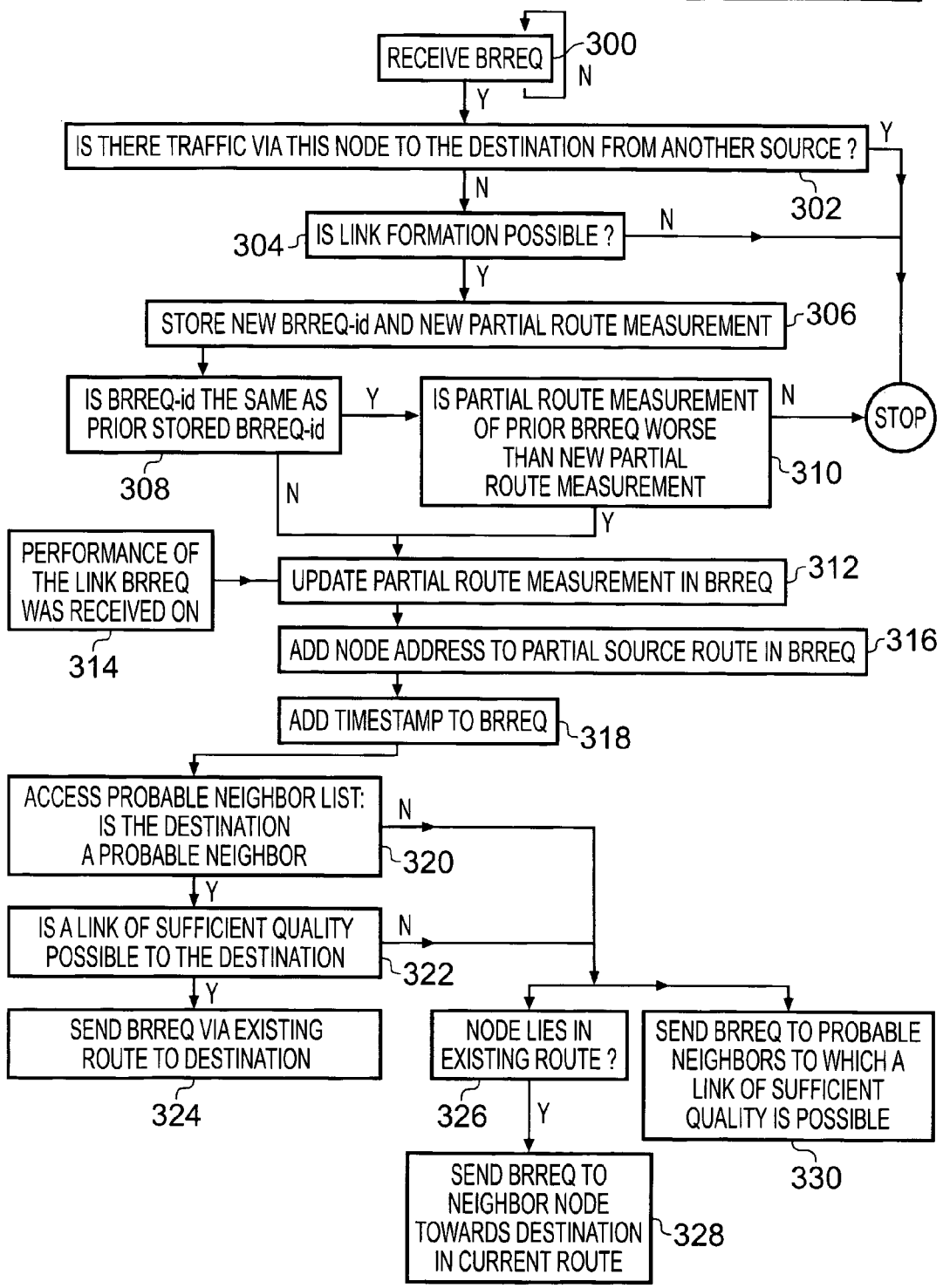
FIG. 3 illustrates a process at an intermediate node between the source node and destination node that continues the network optimization process by either establishing a direct link to the destination node or passing the task of establishing a direct link to the destination node to another intermediate node.
Figure 4:
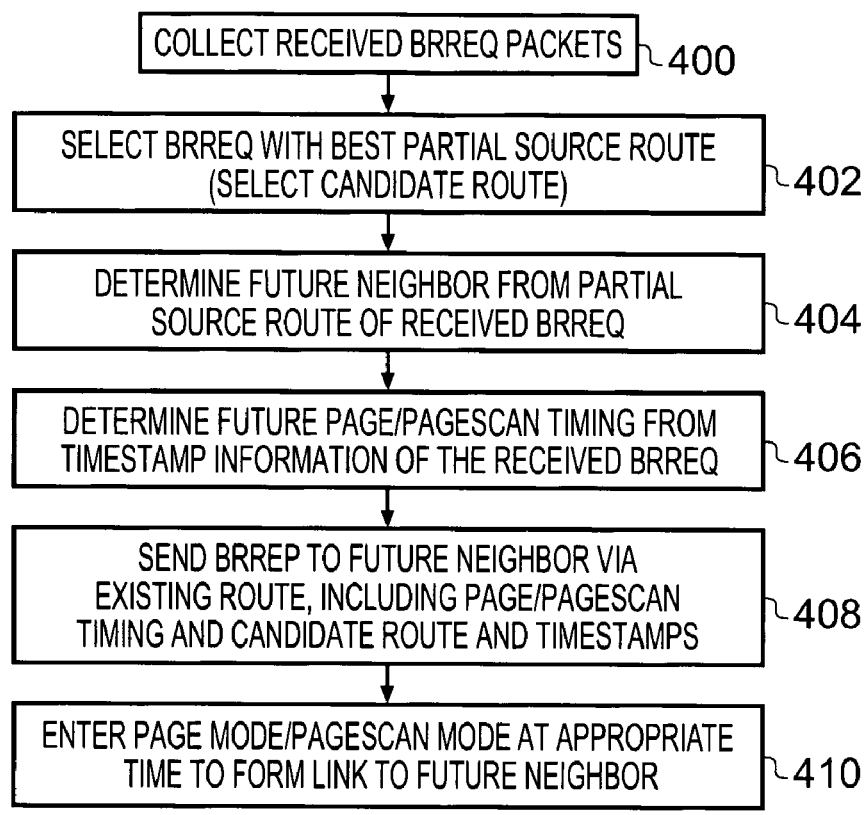
FIG. 4 illustrates a process at the destination node that includes the selection of a candidate route and the start of initializing, via the existing route, use of the inter-node links of the selected candidate route.
Figure 5:
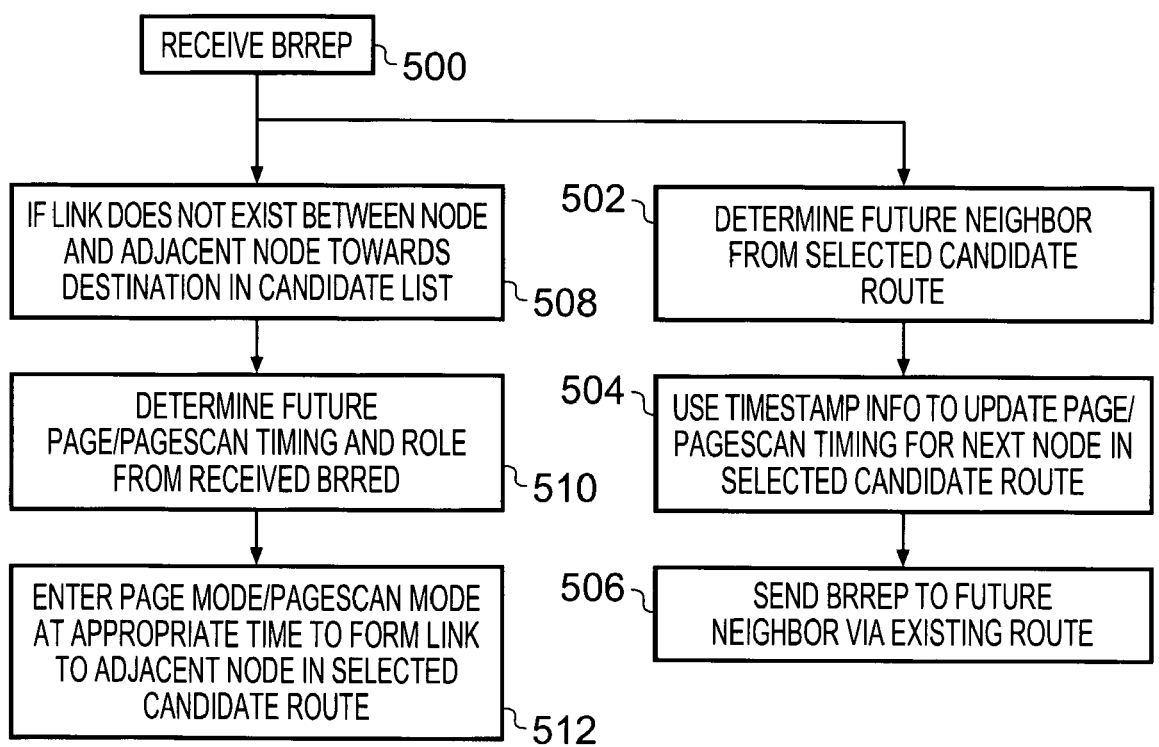
FIG. 5 illustrates a process at a node within the selected candidate route that continues initializing, via the existing route, use of the inter-node links of the selected candidate route.
Figure 6:
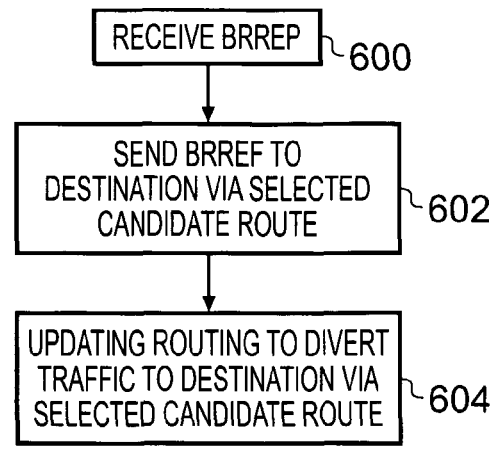
FIG. 6 illustrates a process at the source node that starts the switching of the existing route to the candidate route.
Figure 7:
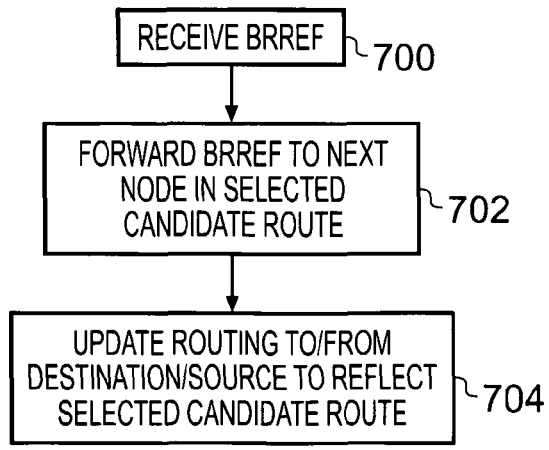
FIG. 7 illustrates a process at an intermediate node in the selected candidate route that continues the switching of the existing route to the candidate route.
Figure 8:
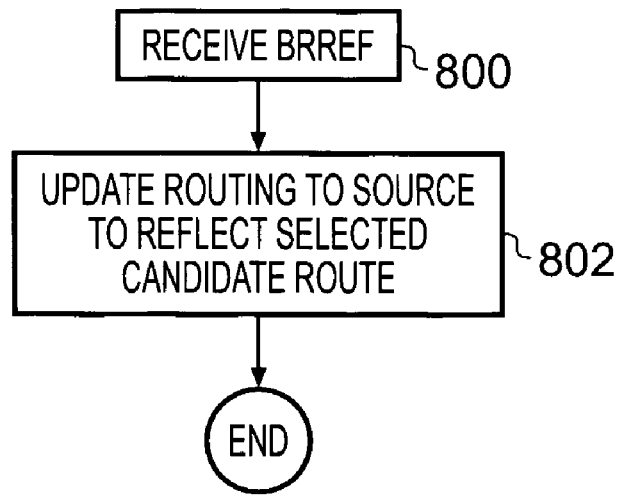
FIG. 8 illustrates a process at the destination node that terminates the switching of the existing route to the candidate route.
Figure 9:
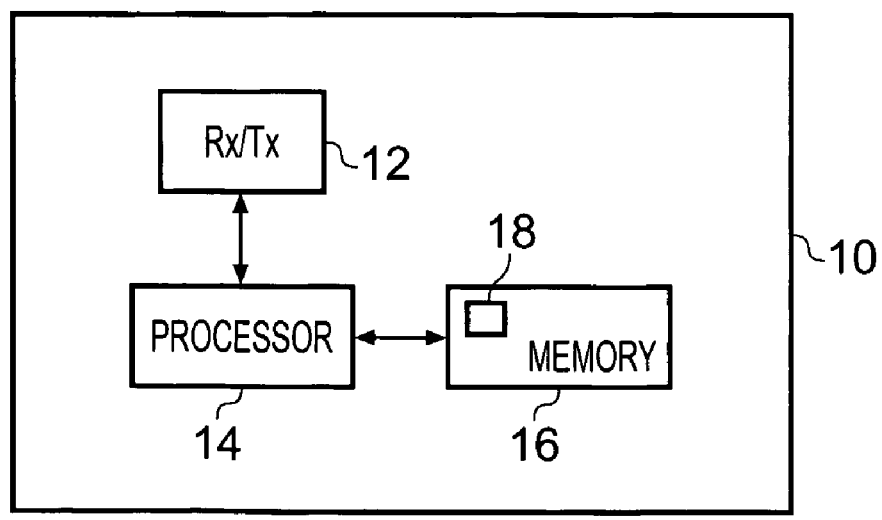
FIG. 9 illustrates a device operable as a node in an ad-hoc network and operable to carry out each of the processes illustrated in FIGS. 1 to 8.

The network optimization process comprises:
a) the generation of candidate routes between a source node and a destination node as illustrated in FIGS. 2 and 3;
b) the selection of a candidate route as illustrated in FIG. 4;
c) initializing, via the existing route, the use of the inter-node links of the selected candidate route as illustrated in FIGS. 4 and 5; and
d) the switching of the existing route to the candidate route as illustrated in FIGS. 6, 7 and 8.

There is also periodic scanning of the active links, and the pruning of the links that are not recently used while ensuring that the network is not partitioned.

Until the network topology is adjusted by the adaptive network formation method, and the routing tables at the nodes are updated to reflect the modified topology, data is transferred over the current network, on existing routes using the usual data routing functions. This ensures less latency for the data traffic and the compatibility of the network optimization protocol with any routing system.

Referring to FIG. 1, after the initial network is formed, each of the nodes notes its current role: master, slave or bridge node. Each node devotes part of its active time to the Device Discovery process (step 100). This process is described in detail in the Bluetooth Specification. During the process a node switches between inquiry and inquiryscan randomly so as to discover potential neighbor nodes and to be discovered as a potential neighbor node. The amount of time the nodes spend in Device Discovery determines the speed with which the network can adapt to the data needs, and it should be ideally dependent on each node's role, traffic needs, and obligations to the current Piconet or Scatternet structure. Nodes in the Scatternet do not synchronize their discovery processes.

A free node spends all of its time in inquiryscan. Whenever it replies to an inquiry probe it immediately goes into the pagescan (until a connection is established or a timeout occurs) in order that the discovering nodes can connect to it. A connected node need not immediately enter pagescan.

When a node discovers a potential neighbor, it immediately tries to page (step 102) the node. If the discovered node is a free node, then the connection is immediately established (step 104), and the free node joins the Scatternet.

If the discovering node fails to connect to the discovered node (common with nodes that are already connected to the network), it calculates a rendezvous time (step 106) and invites (step 108) the discovered node for a link set-up at the rendezvous time by sending LINK-REQ packet through the existing route in the Scatternet. The packet contains the information as illustrated in Table 1.

| LINK-REQ |
| --- |
| Protocol id, |
| Type, |
| Source, |
| Destination, |
| Sequence number, |
| Approximate rendezvous time, |
| Duration of rendezvous, |
| Elapsed time (approximate) from the time request was originated, |
| Native clock value of the source |
| Preferred role of the source in the future link. |

Times are measured in slots. The rendezvous time, and rendezvous duration should be approximately calculated based on the expected Scatternet diameter, and should be large enough to accommodate the relay delays, inter Piconet scheduling delays, and the clock drifts of the nodes on the paths.

Each intermediate node that relays the LINK_REQ packet should update the elapsed time field. If elapsed time were greater than half of the rendezvous time, the node would drop the packet, and returns a LINK-REQ-TIMEOUT packet to the source. When the source receives (step 110) the LINK_REQ_TIMEOUT packet it recalculates (step 112) the rendezvous time, and resends (step 108) the packet.

The destination node that receives a link formation invitation (LINK_REQ) should send a reply (LINK_RE_REP) packet. This packet either confirms the acceptance of the rendezvous (possibly with a modified time), or a rejection of the rendezvous. The packet format is the same, and the times are with respect to request origin time. In addition, when a node receives LINK-REQ packet, it updates its probable neighbor list.

A probable neighbor list is maintained by each node. It lists the probable neighbors of that node. It includes information that allows a probable neighbor to be paged i.e. its Bluetooth Clock value and its Bluetooth address and also contains link quality metric(s) for the link to that probable neighbor. The link quality metric(s) may include one or more of the Bit Error Rate (BER) for the link, the bandwidth (BW) of the link etc.

The probable neighbor list maintained by each node may contain the following information.

| Probable Neighbor List: For each probable neighbor there is stored: |
| --- |
| BT_ADDR, |
| BT clock, |
| Link_quality information, |
| Time of last updating, |
| Next updating time |
| Node role (master or slave) in the temporary link, |
| Current role of the neighbor |

If a node receives (step 114), (step 116) a rejection it again invites the discovered node for a temporary link set up by sending LINK-REQ packet after LINK-TIMEOUT duration.

If the received LINK_RE_REP accepts (step 118) the rendezvous, then at the agreed time (or, if appropriate the newly suggested time) the source establishes (step 120) a temporary link with the discovered node. A temporary link is a link that is established for the sake of measuring (step 122) link quality metrics which are used to update the node's probable neighbor list.

The purpose of temporary link formation is to measure the link quality metrics like Bit error rate (BER), bandwidth (BW), and any other parameters of interest. For example, the information regarding the node's current participation in different Piconets (nodes' role, amount of time spent in each Piconet) can have an affect on the link performance, and hence can also be exchanged during temporary link setup.

When the link is setup, both the nodes also negotiate (step 124) on the future times at which the link is again formed. Therefore, the link quality measurements are done-periodically.

The temporary link is tore down (step 126) as soon as the measurements are done, and the necessary information is exchanged.

If a node is unable to connect to a potential neighbor node in a fixed number of trials for refreshing the link quality metrics, it deems its neighbor has moved, and deletes all the information with respect to this neighbor from its probable neighbor list. When a node loses all of its active links to the neighbors, and is unable to establish a link to at least one of its potential neighbors, it declares itself a free node, and devotes all of its time for inquiry scan, followed by pagescan.

Referring to FIG. 2, when a data connection needs (step 200) to be established with a destination node, a network optimization request is optionally sent to the adaptive network formation module in the node. The network optimization request can be as simple as finding a minimum hop route or a complex requirements on the BER, delay or BW of the route.

If the node already has an active data flow (step 202) to that destination, the request is dropped because supporting multiple flows requires flow or session based routing in the system. We do not assume in this example that the routing function supports this type of routing.

The data source node starts the adaptation process by sending (step 210) or (step 212), (step 214) a BRREQ packet towards the data destination.

If the data destination is a probable neighbor of the data source node (step 204) and if there is available a good enough quality link from the data source to the data destination (step 206) and the link formation is made possible by the current roles of the nodes (step 208), then the data source node would send (step 210) a BRREQ packet via the existing route to the data destination.

If the data destination is not a probable neighbor of the data source node (step 204) or if the data source node does not contain good quality link to the data destination (step 206) or if the link formation is made impossible by the current roles of the nodes (step 208), then the data source node would send (step 212) a BRREQ packet to the next hop node in the current route, and also send (step 214) the BRREQ packet to the probable neighbors with link quality greater than the requested value.

The BRREQ packet contains the following fields:

---
BRREQ
---
Protocol id,
type,
Data source,
Data destination,
RouteRequirement,
*PartialRouteMesurement,
*PartialSourceRoute of nodes (in the yet to be formed network,)
with
their preferred role in a new network,
their infeasible role in a new network, and
the time at which BRREQ was received.
---

*the time to live in hops.

The fields marked with * are updated at each intermediate node in the route from data source to data destination. The new route is established from data destination to data source using the information accumulated in the BRREQ.

The time stamp information recorded in the BRREQ is used for determining the approximate page or pagescan time while constructing the network in a reverse direction as explained below.

The RouteRequirement value conveys the performance requirement of the new route, and the PartialRouteMeasurement value reflects the cumulative partial route measurement made by the intermediate nodes between the source node and the node that sent the BRREQ. The RouteRequirement and PartialRouteMeasurement values would be used in evaluating the new topology or route.

The infeasible role information is necessary to ensure that the new network topology does not require impossible configurations.

In order to improve the system performance, the preferred roles of the nodes are honored as far as possible.

Referring to FIG. 3, upon receiving (step 300) the BRREQ, an intermediate node checks (step 302) to see if the node already has data traffic from a different source flowing to the data destination. If yes, then it would ignore the BRREQ in order to avoid having multiple routes to the same destination. The intermediate node may also drop the BRREQ, if it cannot form any new links (step 304) for capacity reasons, role restriction reasons, or security reasons. After receiving BRREQ, it notes down (step 306) the BRREQ-id and Partial-RouteMeasurement. BRREQ-id is a combination of Data Source, Data Destination, and Sequence Number.

At steps (step 308), (step 310) the intermediate node drops any duplicate BRREQs it receives later except if the duplicate BRREQ packet's PartialRouteMeasurement is better than that of the best previously received BRREQ. The PartialRouteMeasurement of the BRREQ is updated (step 312) with the quality information of the link (step 314) through which the packet is received at the intermediate node. The PartialSourceRoute field of the BRREQ is updated (step 316) with the intermediate node address, and its preferred and infeasible roles. The BREQ packet is stamped (step 318) with the time it was received at the intermediate node.

The intermediate node then checks to see if the data destination is a probable neighbor (step 320) with an acceptable link quality (step 322). If not then the updated BRREQ is forwarded to the nodes that are probable neighbors with good link quality (step 330), and, if the current node lies on the current route to the data destination (step 326), to the next hop node in the current route (step 328). If the data destination is a probable neighbor (step 320) with an acceptable link quality (step 322), then the BRREQ is sent (step 324) via the existing route to the data destination.

Referring to FIG. 4, the data destination node waits (step 400) for some time after it receives the first BRREQ packet in order to collect BRREQ packets from other nodes so as to decide (step 402) on the best new route.

Each received BREQ defines a candidate route in the field PartialSourceRoute and defines a cost for that candidate route in the field PartialRouteMeasurement.

The new route can be selected (step 402) from the candidate routes using, for example, the information in PartialRouteMeasurement and/or PartialSourceRoute. The selection of the route also selects the BRREQ having a PartialRouteMeasurement that defines the new route.

The future neighbor of the data destination node in the new route is determined (step 404) using the PartialSourceRoute associated with the selected BRREQ.

The future page/pagescan timing for the data destination node and the future neighbor node is determined (step 406) from the time stamp information in the selected BRREQ.

The data destination accepts the link formation request BRREQ if its current commitment to the Scatternet, and Piconet are not violated, and sends (step 408) a reply packet BRREP to its future neighbor over the current route. The BRREP is used to establish a new link from the data destination to its future neighbor link. The BRREP is forwarded on towards the data source and enables the formation of links from data destination to data source using the information accumulated in the BRREQ.

The BRREP would contain following fields:

---
BRREP
---
Protocol id,
type,
BRREP source,
BRREP destination,
sequence no,
SourceRoute,
Page or Pagescan time,
preferred role.
---

The SourceRoute is the PartialSourceRoute of the selected BRREQ i.e. the selected candidate route.

At page or pagescan time recorded in the BRREP, both the BRREP source and BRREP destination nodes (neighboring nodes in the new route) enter page or pagescan process to establish the link between them (step 410).

Referring to FIG. 5, the future neighbor receives (step 500) the BRREP and, as the current node, it determines the next hop (future neighbor) towards the data source, and replaces the page/pagescan timing information in the BRREP packet before forwarding it to that node through the existing route. It then establishes a link to the future neighbor, if necessary. This process occurs at every node on the selected candidate route, until the new route is established from the data destination node to the data source node.

The future neighbor of the current node in the new route is determined (step 502) using the SourceRoute of the received BRREP. The future page/pagescan timing is determined (step 504) from the time stamp information in the SourceRoute of the BRREQ. The timestamp information contained in the SourceRoute is used for estimating the approximate time at which the future neighboring node might receive the BRREP, and hence to specify the page/pagescan times. The current node then forwards (step 506) the BRREP packet to its future neighbor over the current route after updating its page/pagescan timing.

If (step 508) a link does not exist between the current node and the adjacent node towards the data destination in the selected candidate route, then the current node determines (step 510) its future pagescan timing and role from the received BRREP and enters (step 512) a page/pagescan mode at the appropriate time to form a link to the adjacent node, towards 5 the destination, in the selected candidate route. The adjacent node is the BRREP source in the received BRREP i.e. the node from which BRREP was forwarded.

Referring to FIG. 6, after receiving (step 600) a BRREP from the data destination, the data source node sends (step 602) a route confirmation BRREF packet to the data destination. A BRREF packet contains the following fields:

| BRREF |
|---|
| Protocol id |
| type |
| Source |
| Destination |
| sequence no |
| source route |
| time to live. |

Immediately after sending BRREF packet, the data source node updates its routing table and starts to divert (step 604) the traffic to the data destination through the new selected candidate route.

Referring to FIG. 7, when a BRREF packet is received (step 700) by an intermediate node in the new selected candidate route, the node forwards (step 702) the BREF packet to the next node in the selected candidate route and updates (step 704) the routes in its routing table to both data source and data destination nodes from the source route information in the packet.

Referring to FIG. 8, when the data destination receives (step 800) the BRREF from the new route, it updates (step 802) its routing table to the data source node, and starts diverting the reverse traffic to the data source via new route. This completes the adaptation of the network to the needs of the data traffic.

If the data destination is unable to accept the BRREQ, it sends BRREP _NEG to a new neighbor node based on the quality information recorded in the BRREQs it receives. The above topology optimization process starts from this new neighbor instead of the data destination.

The Network Optimization Process at each node periodically checks for unused active links to its neighbors. If a link is not used for data traffic in the last LINK_UNUSED_TIMEOUT period, then it tries to terminate the link, if there is at least one alternative route to the neighbor on that link. In order to determine the existence of an alternate route, it broadcasts a DUPROUTE packet to its neighbors within k hops (determined by the TimeToLive field in the PDU). DUPROUTE packet contains the following fields: Protocol id, type, source, destination, sequence no, Destination_Bluetooth_address, TimeToLive. Each node when it receives the DUPROUT packet, it checks to see if it is a duplicate packet. If it is a duplicate packet, it is not processed further. Otherwise it checks to see if the destination is its immediate neighbor. If not, it decrements the TimeToLive field in the DUPROUTE packet, and broadcasts it to its neighbors. If the destination is its immediate neighbor, then it sends a DUPROUTEREPLY packet to the source. The DUPROUTEREPLY packet contains following fields: Protocol id, type, source, destination, sequence no, current node's id. When a node receives DUPROUTEREPLY packet, it checks for source, destination, and sequence number to identify the accessibility of destination from the source. If it has already seen DUPROUTEREPLY that implies same reachability, it will not further process the packet. Otherwise, if the node is not the originator of the corresponding DUPROUTE query, then it forwards the packet towards the source. If it is the originator, then it terminates the link to the destination, and moves the destination to the probable neighbor list. It also resets the LINK_UNUSED_TIMEOUT value for the link through which it received the original DUPROUTEREPLY packet and thus it can keep that link active for a longer period of time.

If a node loses active links to all of its neighbors, it tries to establish links to its probable neighbors by sending BRREQ with destination address as the probable neighbor, and with no route quality requirements. This message is sent when the probable neighbor nodes try to form a temporary link for quality measurement and for updating the probable neighbor node list. If it fails to establish a link to any of its probable neighbors within a NET_LOST time out period, it declares itself detached from the Scatternet, and tries to get reconnected to the network as a tree node.

When nodes move they can discover the nodes that are within their radio range because every node runs a discovery process. A free node devotes all of its available time to inquiry scan until it replies to inquiry probe. It then enters a pagescan process by which the discovering node can immediately connect it. If the Pagescan procedure does not result in a link within a Pagescan_Timeout period, it terminates its pagescan process, and start behaving like a tree node.

FIG. 9 illustrates a electronic device 10 that is Bluetooth enabled. It is capable of operating as a node in an ad-hoc Bluetooth network. It comprises at least a low power radio frequency transceiver 12, a processor 14 and a memory 16. The memory 16 includes computer program instructions 18 which when loaded into the processor 14 control the operation of the device 10. The instructions 18 include program instructions for carrying out the processes illustrated in FIGS. 1 to 8 depending upon the role of the device: source node, intermediate node, destination node. The device is typically mobile.

Thus, for example, the device of FIG. 9 may be operable as a first node in a first ad-hoc network comprising a plurality of nodes, including the first node and a second node, and an existing route between the first node and the second node that comprises a plurality of inter-node links. In such a case, the device should be understood as including: (1) a selection element or means for selecting based on a predetermined performance criterion or criteria one of a plurality of candidate routes between the first node and the second node, wherein each candidate route comprises at least one inter-node link that is not comprised within the first ad-hoc network and at least one candidate route comprises multiple inter-node links; (2) an initializing element or means for initializing, via the existing route, the use of the inter-node links of the selected candidate route; and (3) a switching element or means for switching from using the existing route to using the candidate route.

Or, the device of FIG. 9 may be operable as a node in an ad-hoc network that comprises a plurality of nodes, the device comprising: (1) a receiving element or means for receiving a message; (2) a route history element or means for maintaining a cumulative history of the route the message has taken to the device; (3) a performance cost element or means for maintaining a performance cost of the route the message has taken to the device; (4) a determiner or means for determining if a direct link from the device to the second node is available; (5) a route establishment element or means for establishing a candidate route for routing packets between the first and second nodes that comprises the route the message has taken from the first node to the device and the link between the device and the second node if a direct link from the device to the second node is available; and (6) a forwarding element or means for forwarding the message to at least another device if a direct link from the device to the second node is not available.

Or, the device of FIG. 9 may be operable as a node in a first ad-hoc network comprising a plurality of nodes that are interconnected by a plurality of inter-node links, the device comprising a neighbor list maintenance element or means for maintaining a list of neighboring devices, wherein each neighboring device is operable as a node in an ad-hoc network and operable to have a direct link to the device and wherein the list comprises a plurality of entries each of which is associated with a neighboring device and each of which comprises an identifier of the associated neighboring device and a parameter indicating the quality of a direct link between the associated neighboring device and the device.

Or, the device of FIG. 9 may be operable as a node in an ad-hoc network that comprises a first link between the device and a first node, the device comprising: an identifying element or means for identifying when the first link is unused; (2) a determining element or means for determining whether there is a route via the ad-hoc network other than the first link between the device and the first node; and a terminating element or means for terminating the first link if there is a route.

Similar variations of the device of FIG. 9 are of course possible and will be evident to any person of skill in the art in view of the teachings hereof.

Although embodiments of the present invention have been described in the preceding paragraphs with reference to various examples, it should be appreciated that modifications to the examples given can be made without departing from the spirit and scope of the invention as claimed. For example, embodiments of the invention may find application in mobile cellular radio telephone networks in which base stations are wirelessly linked to each other.

While endeavoring in the foregoing specification to draw attention to those features of the invention believed to be of particular importance it should be understood that the Applicant claims protection in respect of any patentable feature and/or combination of features hereinbefore referred to and/or shown in the drawings whether or not particular emphasis has been placed thereon.

In the claims, means-plus-function clauses are intended to cover the structures described herein as performing the recited function and not only structural equivalents, but equivalent structures.

The invention claimed is:

1. A method of communicating in an ad-hoc network, the method comprising:

broadcasting a DUPROUTE packet to one or more neighbor nodes to determine an existence of one or more alternate routes between a first node and a destination node, wherein the DUPROUTE packet comprises a TimeToLive field, and wherein the one or more neighbor nodes are configured to decrement the TimeToLive field and forward the DUPROUTE packet to additional neighbor nodes if the destination node is not an immediate neighbor of the one or more neighbor nodes;

selecting, solely at a first node, a first candidate route between the first node and a second node based on at least one performance criterion, wherein the first candidate route includes a plurality of links corresponding to at least one intermediate node located between the first node and the second node on the first candidate route, and wherein at least one link of the plurality of links is not included in an existing route between the first node and the second node; discontinuing use of the existing route at the first node; and commencing use of the selected first candidate route at the first node in place of the existing route, wherein use of the plurality of links of the selected first candidate route is initialized via nodes of the existing route; and maintaining use of the selected first candidate route until a second candidate route is selected such that data may be transmitted over the maintained first candidate route until the selected second candidate route is commenced.

2. The method as claimed in claim 1, wherein the at least one performance criterion relates to any one or more of: a number of inter-node links within the first candidate route; a bit error rate for the first candidate route; a delay for the first candidate route; power consumption; interference.

3. The method as claimed in claim 1, further comprising receiving a plurality of messages routed from the first node to the second node each of which comprises a distinct one of a plurality of candidate routes.

4. The method as claimed in claim 3, wherein the initializing, switching and receiving occur at the second node.

5. The method as claimed in claim 3, wherein each of the messages received is a BRREQ (best route request) packet comprising a candidate route defined by a field PartialRouteMeasurement.

6. The method as claimed in claim 3, wherein selecting the first candidate route uses timestamp information from each of the received messages.

7. The method as claimed in claim 3, wherein the plurality of messages originate when the first node is unable to establish a link of sufficient quality to the second node to transfer data.

8. The method as claimed in claim 1, wherein selecting the first candidate route between the first node and the second node uses roles of nodes in the candidate route.

9. The method as claimed in claim 1, wherein the initializing comprises: sending from the second node via the existing route to a neighboring node that neighbors the second node in the selected first candidate route an initialization message for establishing an inter-node link between the second node and the neighboring node.

10. The method as claimed in claim 7, wherein the initialization message comprises timing information for coordinating the neighboring node and second node in establishing an inter-node link.

11. The method as claimed in claim 10, wherein the timing information substantially synchronizes a page scan state and a page state in the second node and neighboring node.

12. The method as claimed in claim 9, wherein the initialization message is a BRREP packet.

13. The method as claimed in claim 1, wherein initializing comprises sending from the second node an initialization message that is sent within the existing network from node to node of the selected first candidate route in sequence and is updated at each node.

14. The method as claimed in claim 13, wherein the initialization message initializes establishment of inter-node links within the selected first candidate route.

15. The method as claimed in claim 13, wherein when the initialization message is received at the first node in the selected first candidate route that node switches from using the existing route to using the selected first candidate route.

16. The method as claimed in claim 1, wherein the switching from using the existing route to using the selected first candidate route occurs at the second node when it receives a switch message from the first node indicating that the first node has switched from using the existing route to using the selected first candidate route.

17. The method as claimed in claim 16, wherein the switch message is a BRREF packet.

18. The method of claim 1, wherein the one or more neighbor nodes are configured to discontinue processing of the DUPROUTE packet if the DUPROUTE packet is a duplicate of a packet the one or more neighbor nodes have previously received.

19. The method of claim 1, further comprising checking for unused active links, wherein an active link is unused if it is not used for data traffic for a pre-determined time period.

20. The method of claim 1, further comprising receiving a DUPROUTEREPLY message from the one or more neighbor nodes in response to the destination node being the immediate neighbor of the one or more neighbor nodes.

21. The method of claim 20, further comprising, in response to receiving the DUPROUTEREPLY message, terminating the link to the destination node and placing the destination node in a probable neighbor list.

22. A node of an ad-hoc network comprising:
a selection element configured to broadcast a DUPROUTE packet to one or more neighbor nodes to determine an existence of one or more alternate routes between a first node and a destination node, wherein the DUPROUTE packet comprises a TimeToLive field, and wherein the one or more neighbor nodes are configured to decrement the TimeToLive field and forward the DUPROUTE packet to additional neighbor nodes if the destination node is not an immediate neighbor of the one or more neighbor nodes;
a selection element configured to select a first, candidate route between a first node and a second node based on at least one performance criterion, wherein the first candidate route includes a plurality of links corresponding to at least one intermediate node located between the first node and the second node on the first candidate route, and wherein at least one link of the plurality of links is not included in an existing route between the first node and the second node;
a processor configured to discontinue use of the existing route; and
commence use of the selected first candidate route in place of the existing route, wherein use of the plurality of links of the selected first candidate route is initialized via nodes of the existing route; and wherein use of the first candidate route is maintained until a second candidate route is selected such that data may be transmitted over the maintained first candidate route until the second candidate route is commenced.

23. A method of improving an existing route between a first node and a second node in an ad-hoc network that comprises a plurality of nodes, the method comprising:
receiving a message at a device in the ad-hoc network;
maintaining a cumulative history of a route the message has taken from the first node to the device;
maintaining a performance cost of the route the message has taken from the first node to the device;
if a direct link from the device to the second node is available, establishing a first candidate route for routing packets between the first and second nodes that comprises the route the message has taken from the first node to the device and the link between the device and the second node and maintaining use of the first candidate route until a second candidate route is selected such that data may be transmitted over the maintained first candidate route until the second candidate route is commenced, else forwarding the message to at least another device, and further establishing the first candidate route for routing packets between the first and second nodes only if the direct link is available and of sufficient quality.

24. The method as claimed in claim 23, further comprising adding a timestamp to the received message at the device.

25. The method as claimed in claim 23, wherein establishing a first candidate route comprises communicating the first candidate route to the second node.

26. The method as claimed in claim 25, wherein the first candidate route is communicated by forwarding the message to the second node.

27. The method as claimed in claim 23, wherein the device is a node of the first ad-hoc network.

28. The method as claimed in claim 23, wherein the at least another device comprises probable neighbors of the device in the ad-hoc network.

29. The method as claimed in claim 23, wherein the at least another device comprises at least another device to which the device in the ad-hoc network can establish a link of sufficient quality.

30. The method as claimed in claim 23, wherein the at least another device comprises a node adjacent the device in the ad-hoc network in the existing route.

31. A device in an ad-hoc network that comprises a plurality of nodes, the device comprising:
a receiver for receiving a message;
a route history maintenance element for maintaining a cumulative history of a route the message has taken to the device;
a determining element for determining if a direct link from the device to a second node is available;
a candidate route establishing element for establishing a first candidate route for routing packets between a first node and the second node that comprises the route the message has taken from the first node to the device and the direct link between the device and the second node if said direct link from the device to the second node is available, wherein use of the first candidate route is maintained until a second candidate route is selected such that data may be transmitted over the maintained first candidate route until the second candidate route is commenced;

a forwarding element for forwarding the message to at least another device if said direct link from the device to the second node is not available, and further establishing the first candidate route for routing packets between the first and second nodes only if the direct link is available and of sufficient quality.

32. A device in a first ad-hoc network comprising a plurality of nodes, including the first node and a second node, and an existing route between the first node and the second node that comprises a plurality of inter- node links, the device comprising:

Means for broadcasting a DUPROUTE packet to one or more neighbor nodes to determine an existence of one or more alternate routes between a first node and a destination node, wherein the DUPROUTE packet comprises a TimeToLive field, and wherein the one or more neighbor nodes are configured to decrement the TimeToLive field and forward the DUPROUTE packet to additional neighbor nodes if the destination node is not an immediate neighbor of the one or more neighbor nodes;

means for selecting based on a predetermined performance criterion or criteria one of a plurality of candidate routes between the first node and the second node, wherein each candidate route comprises at least one inter-node link that is not comprised within the first ad-hoc network and at least one candidate route comprises multiple inter-node links;

means for initializing, via the existing route, use of the inter-node links of the selected candidate route; and means for switching from using the existing route to using the candidate route, wherein the candidate route is maintained until a second candidate route is selected such that data may be transmitted over the maintained candidate route until the second selected candidate route is commenced.

* * * * *

UNITED STATES PATENT AND TRADEMARK OFFICE
CERTIFICATE OF CORRECTION

PATENT NO. : 8,036,207 B2  Page 1 of 1
APPLICATION NO. : 11/628596
DATED : October 11, 2011
INVENTOR(S) : Sivakumar et al.

It is certified that error appears in the above-identified patent and that said Letters Patent is hereby corrected as shown below:

Column 13, line 7, in Claim 10, delete "claim 7," and insert -- claim 9, --.

Column 13, line 63, in Claim 22, delete "first, candidate" and insert -- first candidate --.

Column 15, line 19, in Claim 32, delete "inter- node" and insert -- inter-node --.

Column 15, line 21, in Claim 32, delete "Means" and insert -- means --.

Signed and Sealed this
Twenty-fourth Day of April, 2012

David J. Kappos
*Director of the United States Patent and Trademark Office*